United States Patent
Kim et al.

(10) Patent No.: US 12,266,800 B2
(45) Date of Patent: *Apr. 1, 2025

(54) ELECTRODE AND SECONDARY BATTERY INCLUDING THE SAME

(71) Applicant: LG Energy Solution, Ltd., Seoul (KR)

(72) Inventors: Tae Gon Kim, Daejeon (KR); Sin Young Park, Daejeon (KR); Bo Ram Lee, Daejeon (KR); Hyung Man Cho, Daejeon (KR); Tae Gu Yoo, Daejeon (KR); Min Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 613 days.

This patent is subject to a terminal disclaimer.

(21) Appl. No.: 17/598,617

(22) PCT Filed: Sep. 28, 2020

(86) PCT No.: PCT/KR2020/013285
§ 371 (c)(1),
(2) Date: Sep. 27, 2021

(87) PCT Pub. No.: WO2021/066494
PCT Pub. Date: Apr. 8, 2021

(65) Prior Publication Data
US 2022/0158195 A1      May 19, 2022

(30) Foreign Application Priority Data

Oct. 4, 2019    (KR) ........................ 10-2019-0122964

(51) Int. Cl.
*H01M 4/62*    (2006.01)
*H01M 4/02*    (2006.01)

(52) U.S. Cl.
CPC ...... *H01M 4/625* (2013.01); *H01M 2004/021* (2013.01); *H01M 2004/028* (2013.01)

(58) Field of Classification Search
CPC ........... H01M 4/625; H01M 2004/021; H01M 2004/028
See application file for complete search history.

(56) References Cited

U.S. PATENT DOCUMENTS

| 6,183,714 B1 * | 2/2001 | Smalley | ................. B82Y 30/00 423/445 B |
| 2005/0100497 A1 | 5/2005 | Smalley et al. | |

(Continued)

FOREIGN PATENT DOCUMENTS

| CN | 107381546 A | 11/2017 |
| CN | 107634184 A * | 1/2018 |

(Continued)

OTHER PUBLICATIONS

Zhan Guo-Dong et al., "Electrical properties of nanoceramics reinforced with ropes of single-walled carbon nanotubes", Applied Physics Letters, American Institute of Physics, 2 Huntington Quadrangle, Melville, NY 11747, vol. 83, No. 6, Aug. 11, 2003, pp. 1228-1230.

(Continued)

*Primary Examiner* — Maria Laios
*Assistant Examiner* — Ziheng Lu
(74) *Attorney, Agent, or Firm* — Lerner David LLP

(57) ABSTRACT

An electrode includes an electrode active material layer, wherein the electrode active material layer includes an electrode active material and a conductive agent, wherein the conductive agent includes a first conductive agent and a second conductive agent, wherein the first conductive agent includes a secondary particle in which a plurality of graphene sheets are arranged in different directions and a portion of one graphene sheet is connected to a portion of adjacent another graphene sheet, the second conductive agent includes a carbon nanotube structure in which 2 to 5,000 single-walled carbon nanotube units are bonded to (Continued)

(A)

(B)

(C)

each other, and the carbon nanotube structure is included in an amount of 0.01 wt % to 0.5 wt % in the electrode active material layer. A secondary battery including the electrode is also provided.

18 Claims, 6 Drawing Sheets

(56) References Cited

U.S. PATENT DOCUMENTS

| | | | |
|---|---|---|---|
| 2006/0008407 A1 | 1/2006 | Smalley et al. | |
| 2013/0252499 A1 | 9/2013 | Zhou et al. | |
| 2013/0295374 A1* | 11/2013 | Tang | C01B 32/05 |
| | | | 252/502 |
| 2013/0302697 A1 | 11/2013 | Wang et al. | |
| 2014/0079932 A1* | 3/2014 | Aksay | B82Y 30/00 |
| | | | 428/220 |
| 2014/0127567 A1* | 5/2014 | Kuriki | H01G 11/42 |
| | | | 427/126.3 |
| 2017/0221645 A1 | 8/2017 | Gangopadhyay et al. | |
| 2017/0352868 A1* | 12/2017 | Zhamu | H01M 4/623 |
| 2018/0219212 A1* | 8/2018 | Seol | H01M 4/364 |
| 2019/0036186 A1* | 1/2019 | Kim | H01M 4/8867 |
| 2019/0044150 A1 | 2/2019 | Kim et al. | |
| 2020/0006772 A1* | 1/2020 | Yu | H01M 4/139 |
| 2020/0335794 A1 | 10/2020 | Kim et al. | |

FOREIGN PATENT DOCUMENTS

| | | | |
|---|---|---|---|
| CN | 107819154 A * | 3/2018 | |
| CN | 107919469 A | 4/2018 | |
| CN | 108511753 A | 9/2018 | |
| JP | 5775603 B2 | 9/2015 | |
| JP | 2017084759 A | 5/2017 | |
| KR | 2015-0067049 A | 6/2015 | |
| KR | 20170069153 A * | 6/2017 | |
| KR | 20170113250 A | 10/2017 | |
| KR | 101813893 B1 | 1/2018 | |
| KR | 20180129348 A | 12/2018 | |
| KR | 101937900 B1 | 1/2019 | |
| KR | 20190091411 A | 8/2019 | |
| KR | 102017112 B1 | 9/2019 | |
| WO | 2016025532 A1 | 2/2016 | |

OTHER PUBLICATIONS

Extended European Search Report for Application No. 20871444.4 dated Jun. 8, 2022. 7 pgs.
International Search Report for Application No. PCT/KR2020/013285 mailed Jan. 13, 2021, pp. 1-2.

* cited by examiner (a)          (b)

(A)                  (B)

(A)

(B)

(A)

(B)

(C)

(D)

ELECTRODE AND SECONDARY BATTERY INCLUDING THE SAME

CROSS-REFERENCE TO RELATED APPLICATIONS

This application is a national phase entry under 35 U.S.C. § 371 of International Application No. PCT/KR2020/013285, filed on Sep. 28, 2020, which claims priority from Korean Patent Application No. 10-2019-0122964, filed on Oct. 4, 2019, the disclosures of which are incorporated by reference herein.

TECHNICAL FIELD

The present invention relates to an electrode including an electrode active material layer, wherein the electrode active material layer includes an electrode active material and a conductive agent, wherein the conductive agent includes a first conductive agent and a second conductive agent, wherein the first conductive agent includes a secondary particle in which a plurality of graphene sheets are arranged in different directions and a portion of one graphene sheet is connected to a portion of adjacent another graphene sheet, the second conductive agent includes a carbon nanotube structure in which 2 to 5,000 single-walled carbon nanotube units are bonded to each other, and the carbon nanotube structure is included in an amount of 0.01 wt % to 0.5 wt % in the electrode active material layer, and a secondary battery including the same.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

Since conductivity of the electrode may not be secured only by the electrode active material, resistance of the battery may be excessively high, and thus, the electrode typically additionally includes a conductive agent. Typically, a point-type conductive agent, such as carbon black, has mainly been used, and a line-type conductive agent, such as carbon nanotubes and carbon nanofibers, has also been used to improve capacity of the battery by further improving the conductivity.

A single-walled carbon nanotube is one of the line-type conductive agents, and conductivity in an electrode active material layer is improved due to its thin and elongated shape. Thus, typically, after a dispersion including single-walled carbon nanotube units, in which the single-walled carbon nanotube units were present in a single strand form by completely dispersing the single-walled carbon nanotubes, was prepared, an electrode slurry was prepared by using the dispersion, and the electrode active material layer was prepared by using the electrode slurry. Accordingly, the single-walled carbon nanotubes exist as a unit (single strand) in the electrode active material layer. However, when charge and discharge of the battery are repeated, a surface of the single-walled carbon nanotube unit is damaged or the single-walled carbon nanotube unit is broken, and thus, it may be difficult to maintain a conductive network in the electrode active material layer. Accordingly, the conductive network is blocked or reduced, and this degrades life characteristics of the battery.

Thus, there is also a method of using multi-walled carbon nanotubes to ensure conductivity even when the surface of the carbon nanotube is damaged. However, with respect to the multi-walled carbon nanotube, since it is cut to an excessively short length during preparation of a dispersion due to its structure formed by being grown in units of nodes, there is a limit to improving the conductivity of the electrode.

Even with respect to a plane-type conductive agent such as graphene, electrical conductivity is excellent, but it may be difficult to prepare thin single layer graphene, and, in a case in which thick graphene is used, battery efficiency may be reduced. Also, with respect to the plane-type conductive agent, electrolyte solution mobility may be limited in the battery due to a wide planar contact. Furthermore, since the graphene is mostly present in a form covering the surface of the electrode active material, it is not suitable for forming a long conductive network between the electrode active materials.

Therefore, there is a need for a method capable of reducing resistance of the electrode and improving life characteristics of the battery by introducing a new type of conductive agent.

DISCLOSURE OF THE INVENTION

Technical Problem

An aspect of the present invention provides an electrode having low resistance and capable of improving life characteristics of a battery.

Another aspect of the present invention provides a secondary battery including the electrode.

Technical Solution

According to an aspect of the present invention, there is provided an electrode including an electrode active material layer, wherein the electrode active material layer includes an electrode active material and a conductive agent, wherein the conductive agent includes a first conductive agent and a second conductive agent, wherein the first conductive agent includes a secondary particle in which a plurality of graphene sheets are arranged in different directions and a portion of one graphene sheet is connected to a portion of adjacent another graphene sheet, the second conductive agent includes a carbon nanotube structure in which 2 to 5,000 single-walled carbon nanotube units are bonded to each other, and the carbon nanotube structure is included in an amount of 0.01 wt % to 0.5 wt % in the electrode active material layer.

According to another aspect of the present invention, there is provided a secondary battery including the electrode.

Advantageous Effects

Since an electrode according to the present invention includes a carbon nanotube structure in which 2 to 5,000 single-walled carbon nanotube units are bonded to each other, a conductive network may be maintained smoothly even during charge/discharge processes of a battery. Accordingly, resistance of the electrode may be maintained at a low level, and life characteristics of the battery may be improved. Also, since the carbon nanotube structure is present in the form of a long rope in the electrode, a decrease in conductivity due to damage of the carbon nanotube structure may be suppressed even if the battery is continuously charged and discharged, and a long conductive network may be formed. Furthermore, since the electrode includes a secondary particle in which a portion of one graphene sheet is connected to a portion of adjacent another graphene sheet, the resistance of the battery may be further reduced due to excellent electrical conductivity of the secondary particle. Also, since the secondary particle is mainly disposed on a surface of an electrode active material to contribute to the formation of a short conductive network, the conductive network may be evenly formed over the entire electrode due to the combined use of the secondary particle and the carbon nanotube structure. Furthermore, since the secondary particle exists so that at least a portion of the carbon nanotube structure is fixed to the electrode active material by covering at least a portion of the carbon nanotube structure, the conductive network may be maintained even during repeated charge and discharge of the battery. Furthermore, since the secondary particle may act as a kind of hub which suppresses local presence of electrons due to attraction of the electrons to the carbon nanotube structure in an electrode active material layer, conductivity of the electrode active material layer may be improved to further improve battery lifetime. Also, since an orientation of the carbon nanotube structure may be more diverse by graphene sheets present in various orientations in the secondary particle, the conductive network may be uniformly distributed in the electrode active material layer. Furthermore, since the graphene sheet in the secondary particle has a shorter lateral size than conventional graphene, suppression of electrolyte solution mobility may be minimized.

MODE FOR CARRYING OUT THE INVENTION

Figure 1:
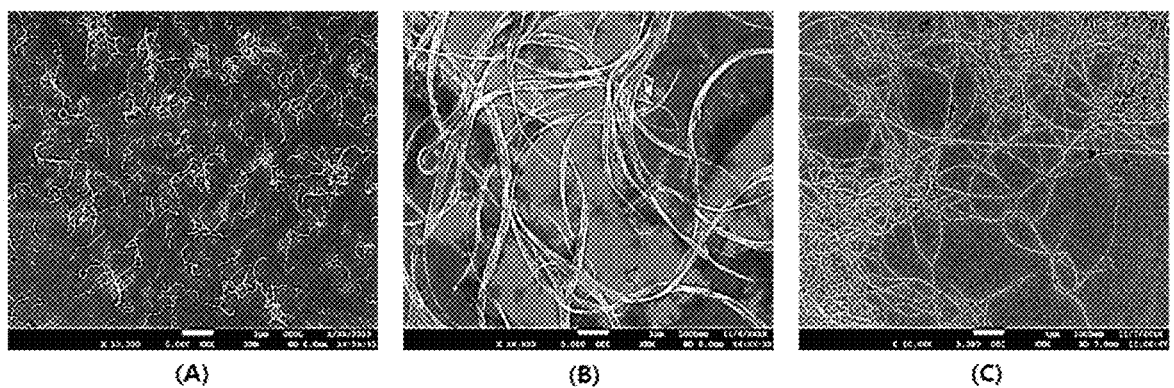
FIG. 1 is scanning electron microscope (SEM) images of a multi-walled carbon nanotube unit (A) used in a comparative example and carbon nanotube structures (B, C) used in examples.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, "%" denotes wt % unless explicitly stated otherwise.

In the present specification, "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

In the present specification, "average particle diameter $(D_{50})$" may be defined as a particle diameter at a cumulative volume of 50% in a particle size distribution curve. The average particle diameter $(D_{50})$, for example, may be measured by using a laser diffraction method. The laser diffraction method may generally measure a particle diameter ranging from a submicron level to a few mm and may obtain highly repeatable and high-resolution results.

In the present invention, the expression "single-walled carbon nanotube unit" denotes a unit in the form of a single-walled tube composed of carbon atoms, and the expression "multi-walled carbon nanotube unit" denotes a unit in the form of a tube with multiple walls composed of carbon atoms.

The expression "graphene" in the present specification denotes a carbonaceous structure which has a form, in which a single graphite plane or a plurality of graphite planes are stacked, flexibility, and a thin film form.

Hereinafter, the present invention will be described in detail.

Electrode

An electrode according to the present invention includes an electrode active material layer, wherein the electrode active material layer includes an electrode active material and a conductive agent, wherein the conductive agent includes a first conductive agent and a second conductive agent, wherein the first conductive agent includes a secondary particle in which a plurality of graphene sheets are arranged in different directions and a portion of one graphene sheet is connected to a portion of adjacent another graphene sheet, the second conductive agent includes a carbon nanotube structure in which 2 to 5,000 single-walled carbon nanotube units are bonded to each other, and the carbon nanotube structure may be included in an amount of 0.01 wt % to 0.5 wt % in the electrode active material layer.

The electrode may include an electrode active material layer. The electrode may further include a current collector, and, in this case, the electrode active material layer may be disposed on one surface or both surfaces of the current collector.

The current collector is not particularly limited as long as it has conductivity without causing adverse chemical changes in the battery, and, for example, copper, stainless steel, aluminum, nickel, titanium, alloys thereof, these materials that are surface-treated with one of carbon, nickel, titanium, silver, or the like, or fired carbon may be used.

The current collector may typically have a thickness of 3 μm to 500 μm, and microscopic irregularities may be formed on the surface of the collector to improve the adhesion of an electrode active material. Also, the electrode collector, for example, may be used in various shapes such as that of a film, a sheet, a foil, a net, a porous body, a foam body, a non-woven fabric body, and the like.

The electrode active material layer may include an electrode active material and a conductive agent.

The electrode active material may be a positive electrode active material or negative electrode active material commonly used in the art, but types thereof are not particularly limited.

For example, as the positive electrode active material, a lithium oxide including lithium and at least one metal such as cobalt, manganese, nickel, or aluminum may be used. Specifically, the lithium oxide may include lithium-manganese-based oxide (e.g., $LiMnO_2$, $LiMn_2O$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$)), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-cobalt-manganese-based oxide (e.g., $Li(Ni_{P1}Co_{Q1}Mn_{R1})O_2$ (where $0<P1<1$, $0<Q1<1$, $0<R1<1$, and $P1+Q1+R1=1$) or $Li(Ni_{P2}Co_{Q2}Mn_{R2})O_4$ (where $0<P2<2$, $0<Q2<2$, $0<R2<2$, and $P2+Q2+R2=2$), etc.), or lithium-nickel-cobalt-manganese-transition metal (M) oxide (e.g., $Li(Ni_{P3}Co_{Q3}Mn_{R3}M^1_S)O_2$ (where $M^1$ is selected from the group consisting of aluminum (Al), copper (Cu), iron (Fe), vanadium (V), chromium (Cr), titanium (Ti), zirconium (Zr), zinc (Zn), tantalum (Ta), niobium (Nb), magnesium (Mg), boron (B), tungsten (W), and molybdenum (Mo), and P3, Q3, R3, and S are atomic fractions of each independent elements, wherein $0<P3<1$, $0<Q3<1$, $0<R3<1$, $0<S<1$, and $P3+Q3+R3+S=1$), etc.), and any one thereof or a compound of two or more thereof may be included.

The negative electrode active material, for example, may include a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_v(0<v<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbonaceous material.

The electrode active material may be included in an amount of 70 wt % to 99.5 wt %, for example, 80 wt % to 99 wt % based on a total weight of the electrode active material layer. When the amount of the electrode active material satisfies the above range, excellent energy density, electrode adhesion, and electrical conductivity may be achieved.

The conductive agent may include a first conductive agent and a second conductive agent.

The first conductive agent may include a secondary particle, and the second conductive agent may include a carbon nanotube structure.

(1) Secondary Particle

The first conductive agent may include a secondary particle, and preferably, the first conductive agent may be a secondary particle. The secondary particle may include a structure in which a plurality of graphene sheets are connected. Specifically, in the secondary particle, at least two graphene sheets may be directly connected to each other or may be indirectly connected. More specifically, the secondary particle has a form in which a portion of one graphene sheet is connected to a portion of adjacent another graphene sheet.

The plurality of graphene sheets may be interconnected to form a secondary particle in the form of a chain, and, more specifically, the secondary particle in the form of a chain may partially include an aggregated region of the plurality of graphene sheets. Since the secondary particle has a unique direct connection structure in the form of a chain, electrical conductivity and thermal conductivity of the conductive agent including the secondary particle may be excellent.

When described in more detail, typical planar graphenes have a two-dimensional arrangement due to a small thickness compared to a width of the plane. Accordingly, most of conductive networks formed in an electrode are formed based on the two-dimensional arrangement. In contrast, the graphene sheets included in the secondary particle include a plurality of graphene sheets having a random arrangement. Specifically, the secondary particle includes a plurality of graphene sheets arranged in different directions (directions perpendicular to the planes of the graphene sheets). That is, the secondary particle may be in a form having a three-dimensional arrangement which is formed by connecting graphene sheets arranged in various directions to each other, and, more specifically, since the graphene sheets are in the form of a chain that is arranged lengthways to have a predetermined length while having the three-dimensional arrangement, the conductive network formed in the electrode may be formed based on the three-dimensional arrangement. Accordingly, since the conductive networks in various directions may be formed and conductive connection between the linear carbon nanotube structure and the secondary particle may be effectively made, conductivity in the electrode may be significantly improved. Herein, the graphene sheet may also include a plurality of graphene sheets arranged in the same direction, but, in such a case, the graphene sheet also includes a plurality of graphene sheets arranged in different directions.

The secondary particle may further include a connection portion connected to at least a part of the graphene sheets of the plurality of graphene sheets. In the present invention, during the preparation of the secondary particle, preliminary particles, such as carbon black, are ruptured by continuous oxidation to form the graphene sheets and a portion retaining its original shape without being ruptured may also be present. In this case, the portion retaining its shape may correspond to the connection portion. Thus, the connection portion may have a non-graphene shape, and the expression "non-graphene shape", different from the above-described graphene sheet, may denote a lump shape having a thickness greater than the graphene sheet, and may more specifically be in the shape of a lump that is not completely ruptured.

A portion of each of the plurality of graphene sheets may be directly connected to each other. Alternatively, at least a portion of the graphene sheets of the plurality of graphene sheets may be connected to each other through the connection portion, and, specifically, at least a portion of each of the plurality of graphene sheets may be connected to the connection portion. The secondary particle of the present invention may include both of the two connection methods.

Figure 3:
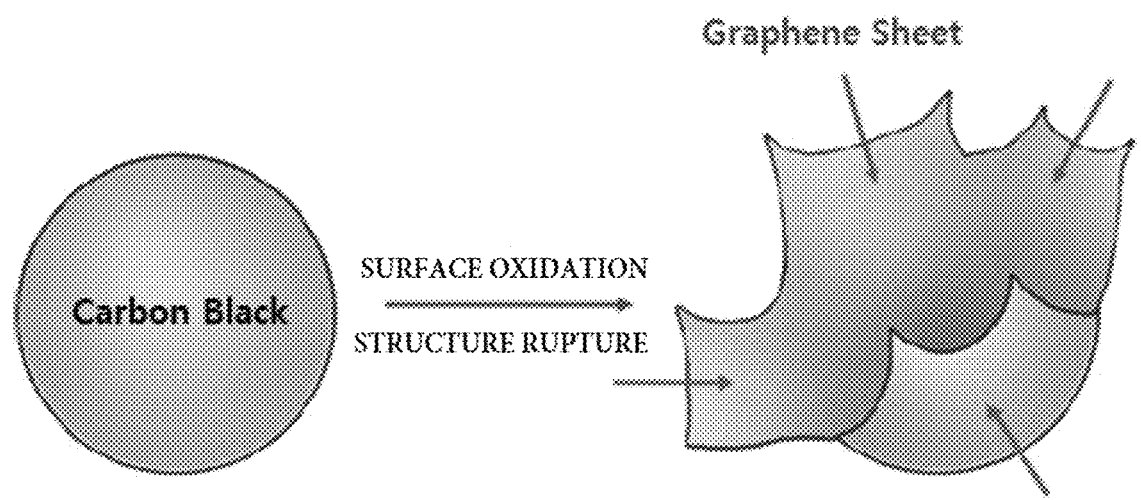
FIG. 3 is a schematic view illustrating a process of forming graphene sheets included in a secondary particle used in the examples.

The secondary particle may be formed by modification of carbon black in the form of a near-spherical particle, for example, acetylene black, furnace black, thermal black, channel black, and lamp black, by an oxidation treatment. Referring to a schematic view of FIG. 3, a structure of carbon black may be modified by an oxidation treatment to form a particle including a plurality of graphene sheets. In a case in which the carbon black is in the form of a secondary particle, a secondary particle, in which particles including the plurality of graphene sheets are aggregated, may be formed.

The graphene sheet may have an average thickness of nm or less, particularly 0.34 nm to 10 nm, and more particularly 0.34 nm to 5 nm. In a case in which the average thickness of the graphene sheet satisfies the above range, since flexibility that is unique to the graphene sheet may be expressed, a surface contact due to the graphene sheet is improved, and thus, electrical conductivity of the conductive agent may be excellent. The graphene sheet may have a shape in which 30 or less graphene layers are stacked. An average thickness of the graphene sheets may correspond to an average value of thicknesses of 100 graphene sheets which are measured by identifying the electrode through a transmission electron microscope (TEM).

The graphene sheet may have a lateral size of 10 nm to 500 nm, particularly 10 nm to 300 nm or less, and more particularly 10 nm to 200 nm, for example, 50 nm to 100 nm. The lateral size of the graphene sheet may be controlled depending on a degree of heat treatment, and, for example, the lateral size of the graphene sheet may be controlled by further performing an additional heat treatment in an inert atmosphere after the oxidation treatment. In a case in which the lateral size of the graphene sheet satisfies the above range, ions in an electrolyte solution may smoothly diffuse in the electrode. Thus, rapid charging characteristics of a battery may be improved and rate capability may also be improved. The lateral size of the graphene sheet denotes an average of lateral sizes of 100 graphene sheets observed by a scanning electron microscope (SEM) or TEM, and, herein, the expression "lateral size" denotes the longest length when assuming a line from one point to another point in one graphene sheet.

The secondary particle may have an oxygen content of 1 wt % or more, for example, 1 wt % to 10 wt % based on a total weight of the secondary particle. In a case in which the oxygen content of the secondary particle satisfies the above range, since the secondary particles may be smoothly dispersed in an electrode slurry formed during the preparation of the electrode, conductivity of the electrode may be improved and capacity of the battery prepared may be improved. The oxygen content may be measured by carbon (C), hydrogen (H), oxygen (O), and nitrogen (N) elemental analysis.

The oxygen content may be achieved during the oxidation treatment of the carbon black. Specifically, an oxygen-containing functional group may be formed on a surface of the secondary particle by the oxidation treatment. The oxygen-containing functional group may be at least one selected from the group consisting of a carboxyl group, a hydroxy group, and a carbonyl group. After the oxidation treatment, the oxygen content may be further controlled by performing a heat treatment on the secondary particles in an inert atmosphere.

The secondary particle may have a higher degree of graphitization than the carbon black before the oxidation treatment. Specifically, since high structural stress caused by surface tension of the spherical carbon black may be partially eliminated due to the formation of the planar graphene sheets and structural defects caused by a curvature may be minimized to form a stable $sp^2$ structure, the degree of graphitization of the prepared conductive agent may be increased.

The secondary particle may have a D/G peak ratio of 2.0 or less, particularly 0.9 to 2.0, and more particularly 1.1 to 1.8 during Raman spectrum measurement. In the Raman spectrum, a G peak near 1590 $cm^{-1}$ is due to $E_{2g}$ vibration mode of $sp^2$ bonds of carbon, and a D peak near 1350 $cm^{-1}$ appears when there is a defect in the $sp^2$ bonds of carbon. That is, in a case in which the D/G peak ratio is satisfied, it denotes that a high degree of graphitization may be obtained, and, accordingly, when the secondary particle is used, capacity and electrical characteristics of the battery may be improved due to the high electrical conductivity of the secondary particle.

The secondary particle may have a value calculated by the following Equation 1 of 0.2 or less, particularly 0 to 0.20, and more particularly 0 to 0.15, for example, 0 to 0.1.

$$\frac{|b-a|}{a} \qquad [\text{Equation 1}]$$

In Equation 1, a is a specific surface area ($m^2/g$) of the secondary particle which is measured by a nitrogen adsorption Brunauer-Emmett-Teller (BET) method, and b is an iodine adsorption value (mg/g) of the secondary particle. In a case in which the secondary particle includes a pore structure in the inside thereof or between the particles, small-sized nitrogen ($N_2$) molecules may be adsorbed a lot in the pores. In contrast, since iodine ($I_2$), as a relatively larger molecule, is difficult to enter into the pores in comparison to the nitrogen, the iodine adsorption value is not large. That is, when the pore structure is present, the value according to Equation 1 is increased. In other words, in the secondary particle, that the value according to Equation 1 is 0.2 or less means that the secondary particle does not include micropores or includes a small amount of the micropores. That is, in a case in which there are no micropores, since a degree of adsorption of iodine and a degree of adsorption of nitrogen are similar to each other, the value of Equation 1 is decreased. This means that the surface of the secondary particle is a free surface. Specifically, most of the carbon black is modified into a hollow structure by the oxidation treatment, and the structure is broken by the continuous oxidation treatment to form graphene sheets. In this case, the graphene sheets may be formed to open outward without forming the pore structure.

The secondary particle may have a specific surface area ($m^2/g$) measured by a nitrogen adsorption BET method of 200 $m^2/g$ or more, particularly 200 $m^2/g$ to 1,100 $m^2/g$, and more particularly 300 $m^2/g$ to 1,100 $m^2/g$, for example, 500 $m^2/g$ to 900 $m^2/g$. In a case in which the above specific surface area range is satisfied, it means that an area of the graphene sheets in the secondary particle is large, and, accordingly, the conductivity of the electrode may be ensured even if an amount of the secondary particles in the electrode is small.

The secondary particle may be included in an amount of 0.01 wt % to 1.0 wt %, particularly 0.05 wt % to 0.5 wt %, and more particularly 0.1 wt % to 0.5 wt % in the electrode active material layer. In a case in which the amount of the secondary particle satisfies the above range, adhesion and electrical conductivity of the electrode may be significantly improved by only using a small amount of the secondary particle, and input/output characteristics and life characteristics of the battery may be improved.

Since the secondary particle is prepared by oxidizing carbon black composed of a plurality of primary particles, the secondary particle has a unique shape including a plurality of graphene sheets generated by rupture of the spherical primary particles. Thus, the secondary particle has carbon black and graphene characteristics to some extent at the same time, and the secondary particle may have abundant surface oxygen functional groups during the oxidation process. Therefore, the secondary particle may solve the problem of low peelability and hard dispersibility of conventional graphene due to the characteristics of the carbon black, and may maintain high electrical conductivity properties of the thin graphene sheet. In addition, when the secondary particle is used together with the carbon nanotube structure, since a mutual aggregation phenomenon (aggregation of the carbon nanotube structure and the secondary particle) by π-π stacking caused by a homogeneous sp2 surface structure of carbon may be suppressed by the abundant surface oxygen functional groups of the secondary particle, the conductive network in the electrode may be formed more closely by contributing to dispersibility of the carbon nanotube structure.

(2) Carbon Nanotube Structure

The second conductive agent may include a carbon nanotube structure, and preferably, the second conductive agent may be a carbon nanotube structure.

The carbon nanotube structure may include a plurality of single-walled carbon nanotube units. Specifically, the carbon nanotube structure may be a carbon nanotube structure in which 2 to 5,000 single-walled carbon nanotube units are bonded to each other. More specifically, in consideration of durability of the electrode and the conductive network, the carbon nanotube structure is most preferably a carbon nanotube structure in which 2 to 4,500, preferably 50 to 4,000, and more preferably 1,000 to 4,000 single-walled carbon nanotube units are bonded to each other.

The single-walled carbon nanotube units may be arranged side by side and bonded in the carbon nanotube structure (cylindrical structure having flexibility in which the units are bonded such that long axes of the units are parallel to each other) to form the carbon nanotube structure. The carbon nanotube structures are interconnected in the electrode to form a network structure.

Typical electrodes including carbon nanotubes are generally prepared by preparing a conductive agent dispersion by dispersing bundle type or entangled type carbon nanotubes (form in which single-walled carbon nanotube units or multi-walled carbon nanotube units are attached or entangled with each other) in a dispersion medium and then using the conductive agent dispersion. In this case, since the carbon nanotubes are fully dispersed in the typical conductive agent dispersion, the carbon nanotubes are present as the conductive agent dispersion in which single-stranded carbon nanotube units are dispersed. With respect to the typical conductive agent dispersion, since the carbon nanotube units are easily cut by an excessive dispersion process, the carbon nanotube units have a length shorter than an initial length. Also, the carbon nanotube units may also be easily cut during a rolling process of the electrode, and the carbon nanotube units (particularly, single-walled carbon nanotube unit) may additionally be cut or surface damaged due to excessive changes in volume of the electrode active material during operation of the battery. Accordingly, since conductivity of the electrode is reduced, the input/output characteristics and life characteristics of the battery may be degraded. Furthermore, with respect to the multi-walled carbon nanotube units, structural defects are high due to a mechanism in which nodes grow (the units are not smooth and linear, but the nodes are present due to defects generated during the growth process). Thus, the multi-walled carbon nanotube units are more easily cut in the dispersion process (see A of FIG. 1), and the short-cut multi-walled carbon nanotube units may be easily aggregated by the π-π stacking caused by the carbon's surface bonding structure (sp2) of the unit. Accordingly, it is more difficult for the multi-walled carbon nanotube units to be more uniformly dispersed in the electrode slurry.

Figure 2:
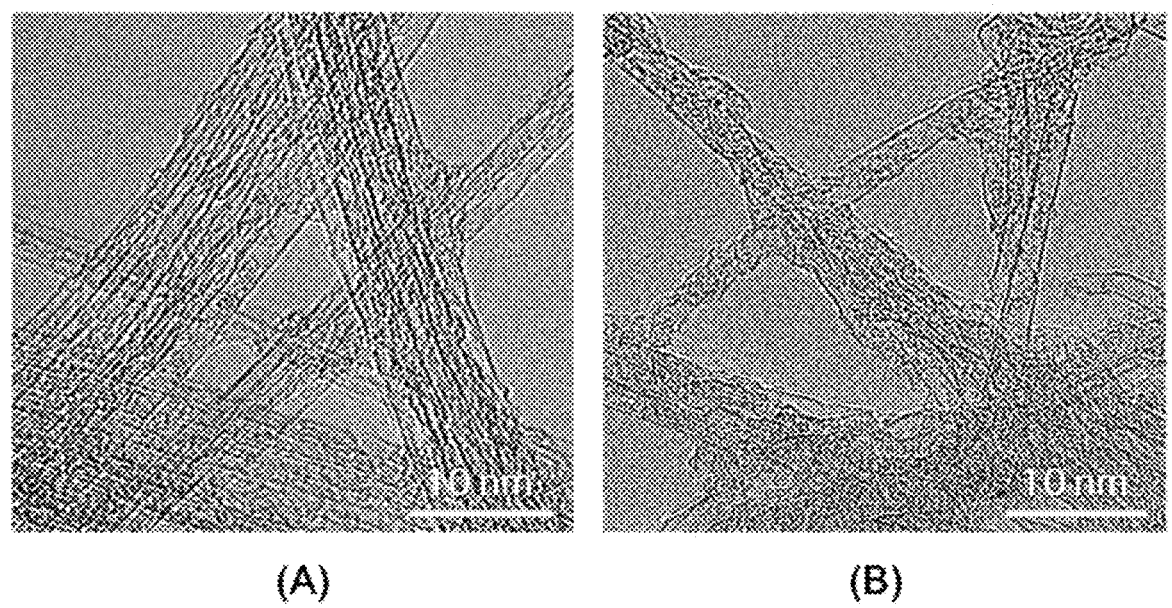
FIG. 2 is transmission electron microscope (TEM) images of the carbon nanotube structure (A) used in the examples and a single-walled carbon nanotube unit (B) used in a comparative example.

Alternatively, with respect to the carbon nanotube structure included in the electrode of the present invention, since the carbon nanotube structure is in the form of a rope in which 2 to 5,000 single-walled carbon nanotube units maintaining relatively high crystallinity without structural defects are arranged side by side and bonded together (see B and C of FIG. 1 and A of FIG. 2), the single-walled carbon nanotube units may not be cut even with changes in the volume of the electrode active material and their length may be smoothly maintained, and thus, the conductivity of the electrode may be maintained even during continuous charge/discharge processes of the battery. Also, since the conductivity of the electrode is increased due to high conductivity of the single-walled carbon nanotube unit having high crystallinity, the input/output characteristics and life characteristics of the battery may be significantly improved. Furthermore, since the carbon nanotube structures are interconnected in the electrode to have a network structure, an excessive change in the volume of the electrode active material may be suppressed to prevent crack generation and a strong conductive network may be secured at the same time. Also, even if cracks are generated in the electrode active material, since the carbon nanotube structure may connect the electrode active materials while crossing the cracks, the conductive network may be maintained. Furthermore, since the carbon nanotube structure is not easily broken and may maintain its long shape, the conductive network may be strengthened over the entire electrode active material layer. Also, electrode adhesion may be significantly improved by inhibiting exfoliation of the electrode active material.

Particularly, from the point of view of the combined use with the secondary particle, the secondary particle is mainly disposed on the surface of the electrode active material to contribute to securing conductivity at small length scales, but the carbon nanotube structure may contribute to securing conductivity at large length scales through the network structure and its large length. Furthermore, since the secondary particle is present while covering at least a portion of the carbon nanotube structure, the conductive network may be closely maintained even with repeated charge and discharge of the battery. Thus, if the secondary particle is used in combination with the carbon nanotube structure, since a close and uniform conductive network may be formed over the entire electrode active material layer while reducing a total amount of the conductive agent used, the input/output characteristics and life characteristics of the battery may be significantly improved.

In the carbon nanotube structure, the single-walled carbon nanotube unit may have an average diameter of 0.5 nm to 5 nm, for example, 1 nm to 5 nm. When the average diameter is satisfied, the conductivity in the electrode may be maximized even with a very small amount of the conductive agent. The average diameter corresponds to an average value of dimeters of top 100 single-walled carbon nanotube units with a larger diameter and bottom 100 single-walled carbon nanotube units with a smaller diameter when the prepared electrode is observed by a TEM.

In the carbon nanotube structure, the single-walled carbon nanotube unit may have an average length of 1 μm to 100 μm, for example, 5 μm to 50 μm. When the average length is satisfied, since a long conductive path for conductive connection between the electrode active materials may be formed and a unique network structure may be formed, the conductivity in the electrode may be maximized even with a very small amount of the conductive agent. The average length corresponds to an average value of lengths of top 100 single-walled carbon nanotube units with a larger length and bottom 100 single-walled carbon nanotube units with a smaller length when the prepared electrode is observed by a TEM.

The single-walled carbon nanotube unit may have a specific surface area of 500 m$^2$/g to 1,000 m$^2$/g, for example, 600 m$^2$/g to 800 m$^2$/g. When the specific surface area satisfies the above range, since the conductive path in the electrode may be smoothly secured by the wide specific surface area, the conductivity in the electrode may be maximized even with a very small amount of the conductive agent. The specific surface area of the single-walled carbon nanotube unit may specifically be calculated from a nitrogen gas adsorption amount at a liquid nitrogen temperature (77K) using BELSORP-mini II by Bell Japan Inc.

The carbon nanotube structure may have an average diameter of 2 nm to 200 nm, particularly 5 nm to 150 nm, and more particularly 50 nm to 120 nm. When the average diameter satisfies the above range, since it is effective in forming a conductive network structure and is advantageous in connecting the active materials, excellent electrical conductivity may be achieved. The average diameter corresponds to an average value of diameters of top 100 single-walled carbon nanotube structures with a larger diameter and bottom 100 single-walled carbon nanotube structures with a smaller diameter when the prepared electrode is observed by an SEM.

The carbon nanotube structure may have an average length of 1 μm to 500 μm, particularly 5 μm to 100 μm, and more particularly 10 μm to 70 μm. When the average length satisfies the above range, since it is effective in forming the conductive network structure and is advantageous in connecting the electrode active materials, excellent electrical conductivity may be achieved. The average length corresponds to an average value of lengths of top 100 carbon nanotube structures with a larger length and lengths of bottom 100 carbon nanotube structures with a smaller length when the prepared electrode is observed by an SEM.

The carbon nanotube structure may be included in an amount of 0.01 wt % to 0.5 wt % in the electrode active material layer, may specifically be included in an amount of 0.01 wt % to 0.15 wt %, and may more specifically be included in an amount of 0.01 wt % to 0.1 wt %. When the amount of the carbon nanotube structure satisfies the above range, since the conductive path in the electrode may be secured, the life characteristics of the battery may be improved while electrode resistance is maintained at a low level. In a case in which the bundle type carbon nanotubes are fully dispersed (as a typical dispersion method in which the carbon nanotubes are dispersed so that single-stranded carbon nanotube units are separated from each other as much as possible) when the conductive agent dispersion is prepared, the carbon nanotube structure is not generated, or is generated in a very small amount (for example, 0.0005 wt %) even if it is unintentionally generated. That is, the above amount range may never be achieved in the usual way. Since the carbon nanotube structure is in the form in which 2 to 5,000 single-walled carbon nanotube units are arranged side by side and bonded together, the carbon nanotube structure may not be cut even with changes in the volume of the electrode active material and their length may be smoothly maintained. Thus, the conductivity of the electrode may be maintained and the conductivity of the electrode may be smoothly secured due to the high conductivity of the carbon nanotube structure. Accordingly, the input/output characteristics and life characteristics of the battery may be excellent even if the amount of the carbon nanotube structure in the electrode is low.

In some cases, the single-walled carbon nanotube unit may be surface-treated through an oxidation treatment or nitridation treatment to improve affinity with a dispersant.

A weight ratio of the secondary particle to the carbon nanotube structure may be in a range of 100:1 to 100:200, particularly 100:2 to 100:100, and more particularly 100:5 to 100:50. In a case in which the weight ratio satisfies the above range, the total amount of the conductive agent for an appropriate level of conductivity may be reduced while increasing a solid content of the electrode slurry. Also, since the adhesion and electrical conductivity of the electrode may be simultaneously improved, the input/output characteristics and life characteristics of the battery may be significantly improved.

The electrode active material layer may further include a binder. The binder is for securing adhesion between the electrode active materials and adhesion of the electrode active material to the current collector, wherein common binders used in the art may be used, and types thereof are not particularly limited. The binder, for example, may include polyvinylidene fluoride-hexafluoropropylene copolymer (PVDF-co-HFP), polyvinyl alcohol, polyacrylonitrile, starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, carboxymethyl cellulose (CMC), a styrene-butadiene rubber (SBR), a fluorine rubber, or various copolymers thereof, and any one thereof or a mixture of two or more thereof may be used.

The binder may be included in an amount of 10 wt % or less, for example, 0.1 wt % to 5 wt % based on the total weight of the electrode active material layer. In a case in which the amount of the binder satisfies the above range, excellent electrode adhesion may be achieved while minimizing an increase in the electrode resistance.

The electrode active material layer may further include at least one of polyvinylidene fluoride and a hydrogenated nitrile butadiene rubber. The polyvinylidene fluoride and the hydrogenated nitrile butadiene rubber play a role in helping to disperse bundle or entangled type single-walled carbon nanotubes or bundle or entangled type multi-walled carbon nanotubes in a conductive agent dispersion used in the preparation of the electrode, and may be included in the electrode because the electrode slurry is prepared from the conductive agent dispersion.

Method of Preparing Electrode

Next, a method of preparing the electrode of the present invention will be described.

The method of preparing the electrode of the present invention may include the steps of: preparing a secondary particle dispersion and a carbon nanotube structure dispersion (S1); and forming an electrode slurry including the secondary particle dispersion, the carbon nanotube structure dispersion, and an electrode active material (S2).

(1) Preparing of the Secondary Particle Dispersion and Carbon Nanotube Structure Dispersion (S1)

1) Preparation of the Secondary Particle Dispersion

The preparing of the secondary particle dispersion includes preparing preliminary particles; and modifying the preliminary particles by an oxidation treatment, wherein the modifying of the preliminary particles by the oxidation treatment includes at least one of a) performing a first heat treatment of the preliminary particles at a temperature of 200° C. to 800° C. in an oxygen atmosphere or an air atmosphere; and b) reacting the preliminary particles with an acidic vapor at 120° C. to 300° C.

In the preparing of the preliminary particles, the preliminary particles may be carbon black. Specifically, the preliminary particles may include at least one selected from the group consisting of acetylene black, furnace black, thermal black, channel black, and lamp black. More specifically, the preliminary particles may be acetylene black which is produced at the highest temperature to basically have an excellent degree of graphitization.

The preparing of the preliminary particles may include pyrolysis of acetylene gas, and carbon black, for example, acetylene black may be formed by the pyrolysis. The acetylene gas may be high purity acetylene gas, and may specifically be acetylene gas with a purity of 95% or more, for example, 98% or more.

The pyrolysis of the acetylene gas may be performed at a temperature of 1,500° C. or more, particularly 1,500° C. to 2,200° C., and more particularly 1,500° C. to 2,000° C. In a case in which the temperature satisfies the above range, a degree of graphitization of the prepared preliminary particles may be high, and a degree of graphitization of the secondary particle thus prepared may also be high. Thus, the electrical conductivity of the conductive agent may be improved.

The preliminary particles may be carbon black, but, among them, acetylene black may be preferred in terms of the following aspect. The graphene sheets, which are included in the secondary particle of the present invention, may be formed by modification of surfaces of the preliminary particles by an oxidation treatment. A surface of the acetylene black formed by the pyrolysis may have a high degree of graphitization. Thus, a structure of graphene sheet may be smoothly formed when the acetylene black is subjected to the oxidation treatment in comparison to a case where other carbon blacks inevitably including some oxygen functional groups on surfaces thereof are subject to the oxidation treatment.

The pyrolysis may be performed in such a manner that, after an internal temperature of a reaction furnace is adjusted to the above temperature range, acetylene gas is introduced into the reaction furnace and the pyrolysis is instantaneously performed. Also, in the process, air, oxygen, and $H_2O$ may be further added to control density of the conductive agent and an oxygen functional group, and a connection structure in the secondary particle may be controlled.

The modifying of the preliminary particles by the oxidation treatment may include at least one of a) performing a first heat treatment of the preliminary particles at a temperature of 200° C. to 800° C. in an oxygen atmosphere or an air atmosphere (step a); and b) reacting the preliminary particles with an acidic vapor at 120° C. to 300° C. (step b).

In step a, the oxygen atmosphere or the air atmosphere may be formed by introducing oxygen or air into the reaction furnace containing the preliminary particles. Specifically, the graphene sheet structure may be formed by an oxidation process in the reaction furnace according to the settings of appropriate flow amount and rate of oxygen or air, reaction temperature, and reaction time during the first heat treatment. Also, conditions of the oxidation process may vary depending on differences in density of the preliminary particles and an amount of the oxygen functional group.

In step a, the first heat treatment may be performed by controlling a temperature of the reaction furnace in the reaction furnace containing the preliminary particles. The first heat treatment may be performed at a heat treatment temperature of 200° C. to 800° C., and may specifically be performed at a heat treatment temperature of 200° C. to 450° C. In a case in which the heat treatment temperature satisfies the above range, excessively rapid oxidation of the preliminary particles may be prevented, and a graphene sheet having a desired size may be formed. The first heat treatment may be performed for 1 hour to 50 hours.

In step b, the preliminary particles may react with an acidic vapor to be oxidized to form graphene sheets. Specifically, the acidic vapor may be a vapor derived from an acidic solution such as HCl and $HNO_3$. A temperature of the acidic vapor reacting with the preliminary particles may be in a range of 120° C. to 300° C.

After the modifying of the preliminary particles by the oxidation treatment, a second heat treatment process in an inert atmosphere may be further performed to increase the size of the graphene sheet formed. Specifically, the method of preparing a secondary particle may further include performing a second heat treatment of the preliminary particles modified by the oxidation treatment at a temperature of 500° C. or more in an inert atmosphere, after the modifying of the preliminary particles by the oxidation treatment. In this case, the inert atmosphere may be formed by vacuum or any one gas selected from the group consisting of helium, argon, and nitrogen. The second heat treatment temperature may be 500° C. or more, particularly 500° C. to 2,800° C., and more particularly 600° C. to 1,600° C.

A mechanism of forming the secondary particle described in the present invention may be as follows. During the preparation of the secondary particle, an oxidation treatment is performed on spherical or chain-type carbon black, in which spherical primary particles have an average diameter of 50 nm or less and the primary particles share the structure, for example, acetylene black under specific conditions. In this case, penetration and oxidation reaction of an oxidizing agent, such as oxygen and acidic vapor, occur from a defect portion such as a grain boundary or a dislocation present in a unit microstructure of the carbon black. When the oxidation treatment is performed for a predetermined time in the temperature range described in the preparation method, the oxidizing agent penetrates into the internal microstructure of the carbon black to cause oxidation. In this case, in order to relieve structural stress of the microstructure of the primary particle which has a radius of curvature greater than a radius of curvature of a surface of the spherical primary particle, an oxidation reaction occurs rapidly in the primary particle. Accordingly, internal carbon atoms are oxidized to gases such as CO, $CO_2$, and $CH_4$, and the primary particles are converted to a hollow type. Most of the structural stresses remaining in the spherical primary particles are also relieved while a surface structure of the hollow-type primary particles is also destroyed by the continuous oxidation treatment, and graphene sheets appear in this process. Thus, the modification process may be accelerated as the average diameter of the carbon black, as the primary particle, is decreased, internal density of the particle is decreased, and an amount of the oxygen functional group in the primary particle is greater than that on the surface of the primary particle. Also, step a is more desirable than step b in terms of the fact that step a may further accelerate the modification process.

After a mixed solution including the secondary particle prepared by the above-described method, a dispersion medium, and a dispersant is prepared, the secondary particle dispersion may be prepared by using a homogenizer, a bead mill, a ball mill, a basket mill, an attrition mill, a universal stirrer, a clear mixer, a spike mill, a TK mixer, or a method such as sonication. Since the dispersion medium and the dispersant may be the same as those used in the preparation of the carbon nanotube structure dispersion to be described later, the dispersion medium and the dispersant will be described below.

2) Preparation of the Carbon Nanotube Structure Dispersion

The preparation of the carbon nanotube structure dispersion may include the steps of: preparing a mixed solution including a dispersion medium, a dispersant, and bundle type single-walled carbon nanotubes (bonded body or aggregate of single-walled carbon nanotube units) (S1-1); and forming a carbon nanotube structure, in which 2 to 5,000 single-walled carbon nanotube units are bonded side by side, by dispersing the bundle type single-walled carbon nanotubes by applying a shear force to the mixed solution (S1-2).

In step S1-1, the mixed solution may be prepared by adding bundle type single-walled carbon nanotubes and a dispersant to a dispersion medium. The bundle type single-walled carbon nanotubes are present in the form of a bundle in which the above-described single-walled carbon nanotube units are bonded, wherein the bundle type carbon nanotube includes usually 2 or more, substantially 500 or more, for example, 5,000 or more single-walled carbon nanotube units.

The bundle type single-walled carbon nanotube may have a specific surface area of 500 $m^2/g$ to 1,000 $m^2/g$, for example, 600 $m^2/g$ to 800 $m^2/g$. When the specific surface area satisfies the above range, since the conductive path in the electrode may be smoothly secured by the wide specific surface area, the conductivity in the electrode may be maximized even with a very small amount of the conductive agent.

The bundle type single-walled carbon nanotubes may be included in an amount of 0.1 wt % to 1.0 wt %, for example, 0.2 wt % to 0.5 wt % in the mixed solution. When the amount of the bundle type single-walled carbon nanotubes satisfies the above range, since the bundle type single-walled carbon nanotubes are dispersed in an appropriate level, a carbon nanotube structure may be formed at an appropriate level and dispersion stability may be improved.

The dispersion medium, for example, may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used, but the present invention is not limited thereto. Specifically, the dispersion medium may be N-methylpyrrolidone (NMP).

The dispersant may include at least one selected from a hydrogenated nitrile butadiene rubber, polyvinylidene fluoride, and carboxy methyl cellulose, and may specifically be polyvinylidene fluoride or a hydrogenated nitrile butadiene rubber.

In the conductive agent dispersion, a weight ratio of the bundle type carbon nanotubes to the dispersant may be in a range of 1:0.1 to 1:7, for example, 1:1 to 1:6. In a case in which the weight ratio satisfies the above range, since the bundle type single-walled carbon nanotubes are dispersed in an appropriate level, a carbon nanotube structure may be formed at an appropriate level and the dispersion stability may be improved.

A solid content in the mixed solution may be in a range of 0.1 wt % to 20 wt %, for example, 1 wt % to 10 wt %. In a case in which the solid content satisfies the above range, since the bundle type single-walled carbon nanotubes are dispersed in an appropriate level, a carbon nanotube structure may be formed at an appropriate level and the dispersion stability may be improved. Also, the electrode slurry may have viscosity and elasticity suitable for an electrode preparation process, and it also contributes to increase the solid content of the electrode slurry.

In step S1-2, a process of dispersing the bundle type carbon nanotubes in the mixed solution may be performed by using a mixing device such as a homogenizer, a bead mill, a ball mill, a basket mill, an attrition mill, a universal stirrer, a clear mixer, a spike mill, a TK mixer, or sonication equipment. Among them, a bead-mill method is preferred in that it may precisely control the diameter of the carbon nanotube structure, may achieve a uniform distribution of the carbon nanotube structure, and may have advantages in terms of cost.

The bead-mill method may be as follows. The mixed solution may be put in a vessel containing beads, and the vessel may be rotated to disperse the bundle type single-walled carbon nanotubes.

In this case, conditions under which the bead-mill method is performed are as follows.

The beads may have an average diameter of 0.5 mm to 1.5 mm, for example, 0.5 mm to 1.0 mm. In a case in which the average diameter satisfies the above range, the diameter of the carbon nanotube structure may be properly controlled without breaking the carbon nanotube structure during a dispersion process, and a dispersion solution with a uniform composition may be prepared.

A rotational speed of the vessel may be in a range of 500 RPM to 10,000 RPM, for example, 2,000 RPM to 6,000 RPM. In a case in which the rotational speed satisfies the above range, the diameter of the carbon nanotube structure may be properly controlled without breaking the carbon nanotube structure during the dispersion process, and a dispersion solution with a uniform composition may be prepared.

The time during which the bead mill is performed may be in a range of 0.5 hours to 2 hours, particularly 0.5 hours to 1.5 hours, and more particularly 0.8 hours to 1 hour. In a case in which the time satisfies the above range, the diameter of the carbon nanotube structure may be properly controlled without breaking the carbon nanotube structure during the dispersion process, and a dispersion solution with a uniform composition may be prepared. The performance time of the bead mill means total time during which the bead mill is used, and, thus, for example, if the bead mill is performed several times, the performance time means total time required for performing the bead mill several times.

The above bead mill conditions are for dispersing the bundle type single-walled carbon nanotubes at an appropriate level, and specifically exclude the case where the bundle type single-walled carbon nanotubes are completely dispersed into single-stranded single-walled carbon nanotubes. That is, the above bead mill conditions are for forming the carbon nanotube structure in which 2 to 5,000 single-walled carbon nanotube units are bonded together side by side in the conductive agent dispersion prepared by appropriately dispersing the bundle type single-walled carbon nanotubes. This may be achieved only when a composition of the mixed solution and dispersion process (e.g., bead mill process) conditions are strictly controlled.

A carbon nanotube structure dispersion may be formed through the above process.

(2) Forming of the Electrode Slurry including the Secondary Particle Dispersion, the Carbon Nanotube Structure Dispersion, and Electrode Active Material (S2)

When the secondary particle dispersion and the carbon nanotube structure dispersion are prepared through the above-described processes, an electrode slurry including the dispersions and an electrode active material is formed. In this case, the above-described electrode active materials may be used as the electrode active material.

In this case, the electrode active material may be first mixed with the carbon nanotube structure dispersion, and then, the secondary particle dispersion may be added. If the mixing is performed in reverse order, since the carbon nanotube structures are not properly dispersed by a π-π bond, do not connect the electrode active materials to each other, and are aggregated to each other, the conductive network of electrode may not be formed effectively.

Also, a binder and a solvent may be further included in the electrode slurry, if necessary. In this case, the binder of the above-described embodiment may be used as the binder. The solvent, for example, may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used, but the present invention is not limited thereto. The solvent may be the same or different from the dispersion medium used in the pre-dispersion, and the solvent may preferably be N-methylpyrrolidone (NMP).

Next, the electrode slurry prepared as described above is dried to form an electrode active material layer. Specifically, the electrode active material layer may be prepared by a method of coating the electrode slurry on an electrode collector and drying the coated electrode collector, or may be prepared by a method of casting the electrode slurry on a separate support and then laminating a film separated from the support on the electrode collector. If necessary, the electrode active material layer is formed by the above-described method, and a rolling process may then be further performed. In this case, the drying and the rolling may be performed under appropriate conditions in consideration of physical properties of the electrode to be finally prepared, and are not particularly limited.

Secondary Battery

A secondary battery according to another embodiment of the present invention may include a negative electrode, a positive electrode, a separator disposed between the positive electrode and the negative electrode, and an electrolyte, and at least one of the positive electrode and the negative electrode may be the electrode of the above-described embodiment. Specifically, the electrode of the above-described embodiment may be the positive electrode of the present embodiment.

The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous organic solvent, wherein, for example, at least one selected from the group consisting of $F^-$, $Cl^-$, $I^-$, $NO_3^-$, $N(ON)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CO_2^-$, $(CF_3)_2CH^-$, $(CF_3SO_2)_2 CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in detail, according to specific examples and comparative examples.

Preparation Example 1: Preparation of Secondary Particle Dispersion (1) Formation of Preliminary Particles (Acetylene Black)
Acetylene black was formed by pyrolysis of acetylene gas having a purity of 98% by instantaneously injecting the acetylene gas into a reaction furnace with an internal temperature of 2,000° C.
(2) Preparation of Secondary Particle
Subsequently, the internal temperature of the reaction furnace containing the acetylene black was set to 250° C., and an oxidation treatment was then performed for 30 hours while introducing oxygen. As a result, secondary particles, which included a chain shape in which a plurality of graphene sheets having a lateral size of about 41 nm were connected to each other, wherein the secondary particles included a plurality of graphene sheets arranged in different directions, were obtained. (see (a) of FIG. 4 and FIG. 5)
(3) Dispersion Preparation
The secondary particles (powder form), a hydrogenated nitrile butadiene rubber (H—NBR) as a dispersant, and N-methylpyrrolidone (NMP), as a dispersion medium, were mixed at a weight ratio of 5.7:1.71:92.59 to form a mixture. The mixture was added to a spike mill, in which 80% was filled with beads having a diameter of 0.65 mm, dispersed, and discharged at a discharge rate of 2 kg/min. The secondary particles were completely dispersed by performing this process twice to prepare the secondary particle dispersion.

Preparation Example 2: Preparation of Secondary Particle Dispersion

Figure 4:
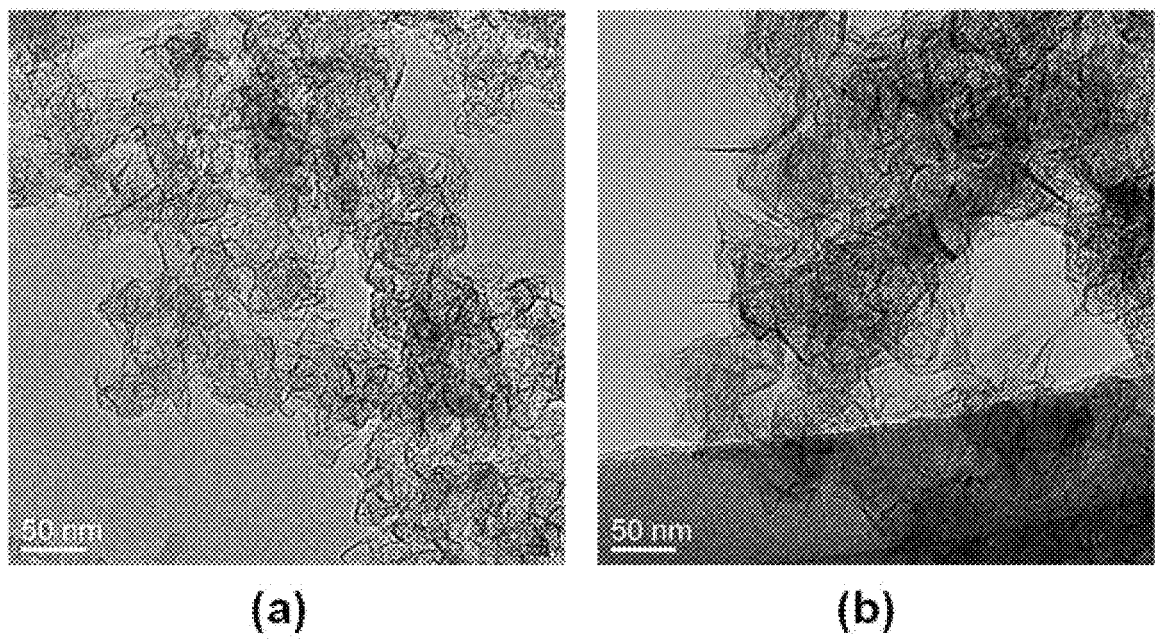
FIG. 4 is TEM images of (a) a secondary particle used in Preparation Example 1 and (b) a secondary particle used in Preparation Example 2.
Figure 5:
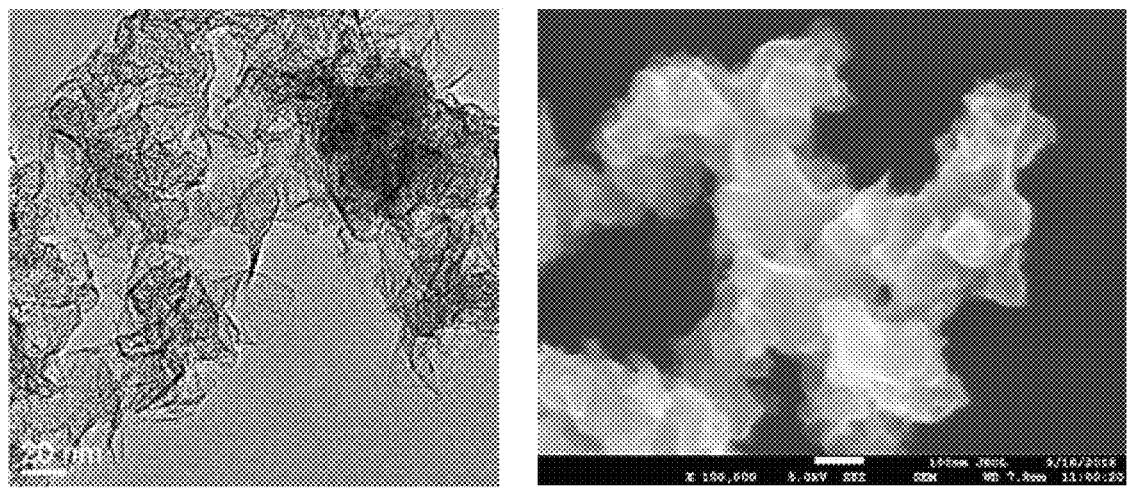
FIG. 5 is an SEM image and a TEM image of the secondary particle used in the examples.

An additional heat treatment was performed on the secondary particles used in Preparation Example 1 at 900° C. for 1 hour in an inert atmosphere to obtain secondary particles which included a chain shape in which a plurality of graphene sheets having a lateral size of about 65 nm were connected to each other, wherein the secondary particles included a plurality of graphene sheets arranged in different directions. Referring to FIG. 4, it may be understood that the secondary particles of Preparation Example 1 illustrated in FIG. 4(a) were modified to the secondary particles of Preparation Example 2 illustrated in FIG. 4(b) by the heat treatment. Specifically, it may be understood that, since the adjacent graphene sheets are interconnected by the heat treatment, the lateral size was increased. Thereafter, a dispersion was prepared in the same manner as in the dispersion preparation process of Preparation Example 1 by using the secondary particles.

Preparation Example 3: Preparation of Carbon Nanotube Structure Dispersion

Bundle type single-walled carbon nanotubes (specific surface area of 650 m$^2$/g) composed of single-walled carbon nanotube units having an average diameter of 1.5 nm and an average length of 5 μm or more and polyvinylidene fluoride (PVdF, KF9700, weight-average molecular weight: 880,000 g/mol) were mixed in N-methylpyrrolidone (NMP), as a solvent, to prepare a mixture such that a solid content was 2.4 wt %.

The bundle type single-walled carbon nanotubes were dispersed in the solvent by stirring the mixture by a bead-mill method and thus, a carbon nanotube structure dispersion was prepared. In this case, beads had a diameter of 1 mm, a rotational speed of a stirring vessel containing the beads was 3,000 RPM, and the stirring was performed for 60 minutes. The carbon nanotube structure dispersion included a carbon nanotube structure in the form in which 2 to 5,000 single-walled carbon nanotube units were bonded side by side (see A of FIG. 2).

In the carbon nanotube structure dispersion, an amount of the carbon nanotube structure was 0.4 wt %, and an amount of the polyvinylidene fluoride was 2.0 wt %.

Preparation Example 4: Preparation of Carbon Nanotube Structure Dispersion

A carbon nanotube structure dispersion was prepared in the same manner as in Preparation Example 3 except that the polyvinylidene fluoride in Preparation Example 3 was changed to a hydrogenated nitrile butadiene rubber (weight-average molecular weight: 260,000 g/mol).

Preparation Example 5: Preparation of Carbon Black Dispersion

Carbon black (in the form of a secondary particle composed of primary particles having an average diameter of nm) with a specific surface area of 240 m$^2$/g and a hydrogenated nitrile butadiene rubber (weight-average molecular weight: 260,000 g/mol) were mixed in N-methylpyrrolidone (NMP), as a solvent, to prepare a mixture such that a solid content was 16.5 wt %.

The carbon black was dispersed in the solvent by stirring the mixture by a bead-mill method and thus, a carbon black dispersion was prepared. In this case, beads had a diameter of 1 mm, a rotational speed of a stirring vessel containing the beads was 3,000 RPM, and the stirring was performed for 60 minutes.

In the carbon black dispersion, an amount of the carbon black was 15 wt %, and an amount of the hydrogenated nitrile butadiene rubber was 1.5 wt %.

Preparation Example 6: Preparation of Single-Walled Carbon Nanotube Unit Dispersion Bundle type single-walled carbon nanotubes (specific surface area of 650 m$^2$/g) composed of single-walled carbon nanotube units having an average diameter of 1.5 nm and an average length of 5 μm or more and a hydrogenated nitrile butadiene rubber (weight-average molecular weight: 260,000 g/mol) were mixed in N-methylpyrrolidone (NMP), as a solvent, to prepare a mixture such that a solid content was 4.4 wt % (0.4 wt % of the bundle type single-walled carbon nanotubes, 4.0 wt % of the hydrogenated nitrile butadiene rubber).

The bundle type single-walled carbon nanotubes were dispersed in the solvent by stirring the mixture by a bead-mill method and thus, a conductive agent dispersion was prepared. In this case, beads had a diameter of 1 mm, a rotational speed of a stirring vessel containing the beads was 3,000 RPM, and stirring for 60 minutes under the above conditions was set as one cycle and total 4 cycles (natural cooling was performed for 60 minutes between each cycle) were performed. Accordingly, a single-walled carbon nanotube unit dispersion was prepared (see B of FIG. 2). In the dispersion, since the bundle-type single-walled carbon nanotubes were completely dispersed, the single-walled carbon nanotube unit only existed as a single-strand unit, but the above-described carbon nanotube structure was not detected. Also, in the single-walled carbon nanotube unit dispersion, an amount of the carbon nanotube structure was 0.4 wt %, and an amount of the hydrogenated nitrile butadiene rubber was 4.0 wt %.

Preparation Example 7: Preparation of Multi-Walled Carbon Nanotube Unit Dispersion Bundle type multi-walled carbon nanotubes, a hydrogenated nitrile butadiene rubber (H—NBR) as a dispersant, and N-methylpyrrolidone (NMP), as a dispersion medium, were mixed at a weight ratio of 4:0.8:95.2 to form a mixture. The mixture was added to a spike mill, in which 80% was filled with beads having a diameter of 0.65 mm, dispersed, and discharged at a discharge rate of 2 kg/min. The bundle type multi-walled carbon nanotubes were completely dispersed by performing this process twice to prepare a multi-walled carbon nanotube unit dispersion.

Preparation Example 8: Preparation of Graphene Dispersion

Graphene (powder form), a hydrogenated nitrile butadiene rubber (H—NBR) as a dispersant, and N-methylpyrrolidone (NMP), as a dispersion medium, were mixed at a weight ratio of 3.6:1.2:95.2 to form a mixture. The mixture was added to a spike mill, in which 80% was filled with beads having a diameter of 0.65 mm, dispersed, and discharged at a discharge rate of 2 kg/min. The chemically expanded graphene was completely dispersed by performing this process twice to prepare a graphene dispersion.

EXAMPLES AND COMPARATIVE EXAMPLES

Example 1: Preparation of Positive Electrode

The secondary particle dispersion of Preparation Example 1, the carbon nanotube structure dispersion of Preparation Example 3, LiNi$_{0.6}$Co$_{0.2}$Mn$_{0.2}$O$_2$ (NCM622), and a binder (polyvinylidene fluoride: PVDF, KF9700) were mixed with N-methylpyrrolidone (NMP) to prepare a positive electrode slurry in which a solid content was 69.2%. The positive electrode slurry was coated on a 20 μm thick aluminum (Al) thin film current collector, dried at 130° C., and then rolled to prepare a positive electrode including a positive electrode active material layer.

97.8 wt % of the LiNi$_{0.6}$Co$_{0.2}$Mn$_{0.2}$O$_2$ (NCM622), 1.71 wt % of the polyvinylidene fluoride, 0.09 wt % of the hydrogenated nitrile butadiene rubber, 0.3 wt % of the secondary particles, and 0.1 wt % of the carbon nanotube structure were included in the positive electrode active material layer.

Figure 6:
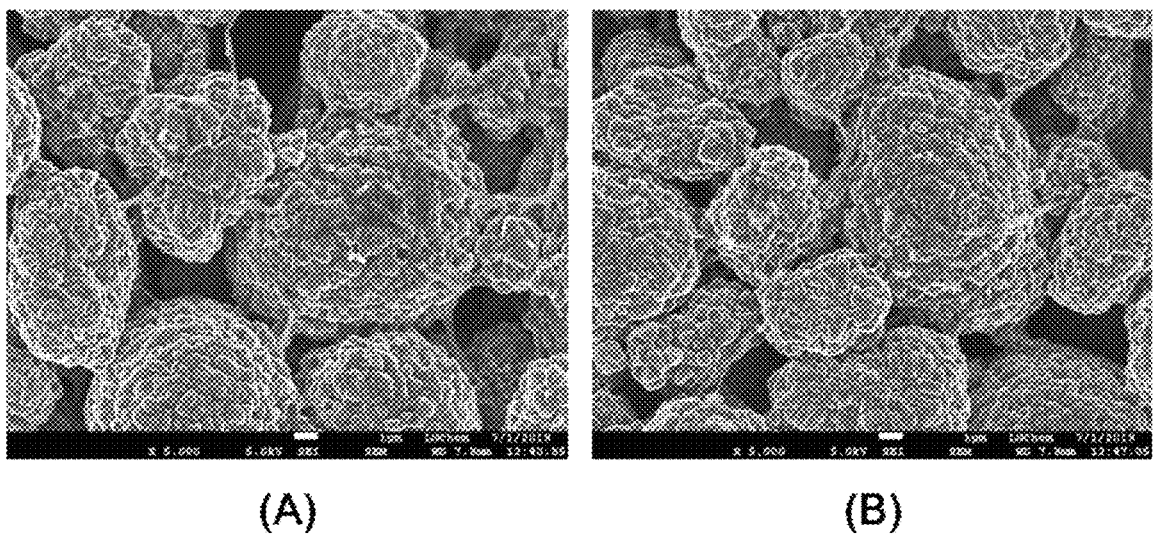
FIG. 6 is SEM images of an electrode of Example 1.
Figure 7:
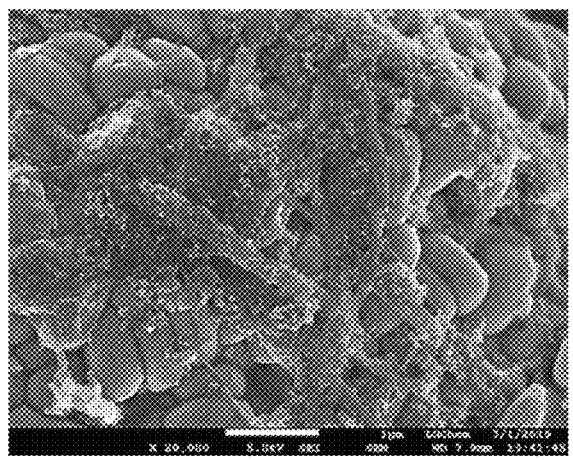
FIG. 7 is SEM images of the electrode of Example 1.
Figure 7:
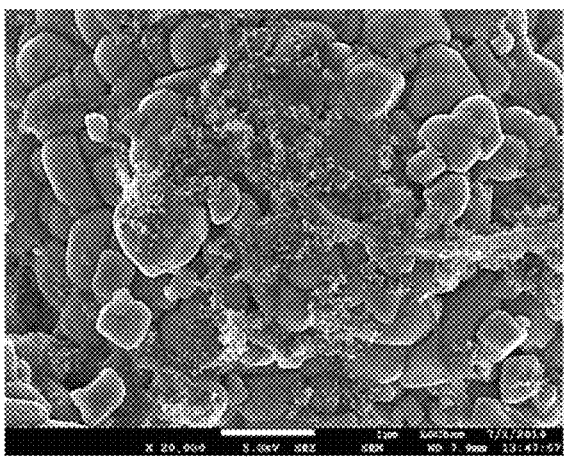
Figure 8:
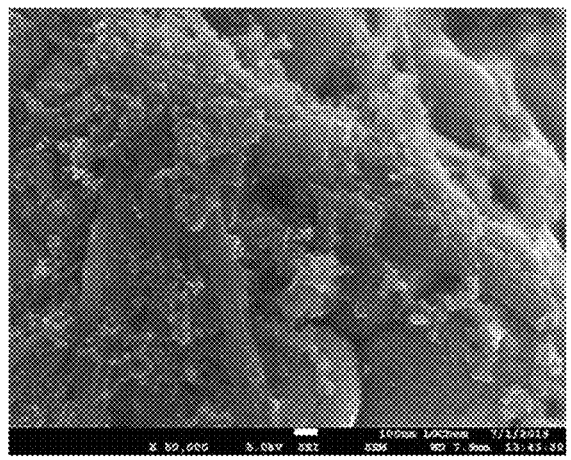
FIG. 8 is SEM images of the electrode of Example 1.
Figure 8:
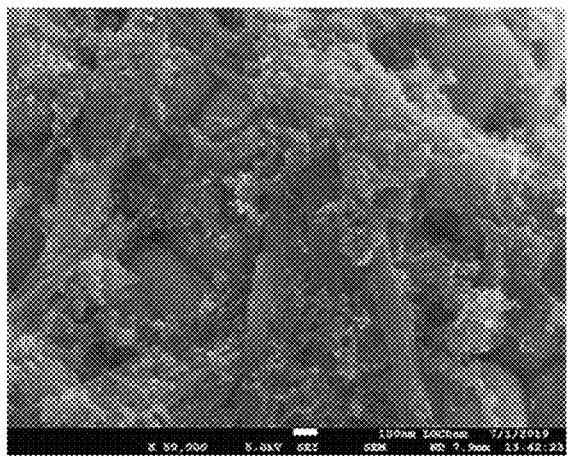
Figure 8:
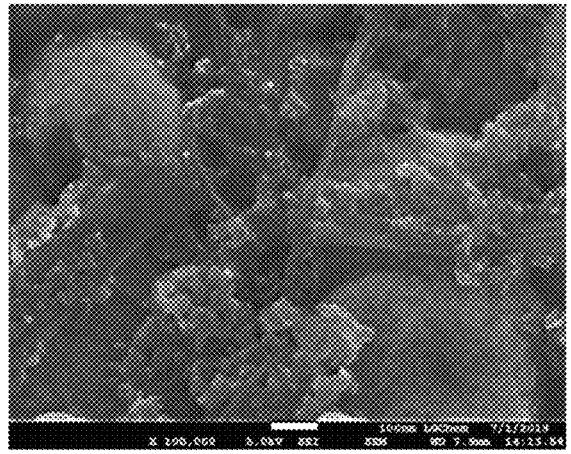
Figure 8:
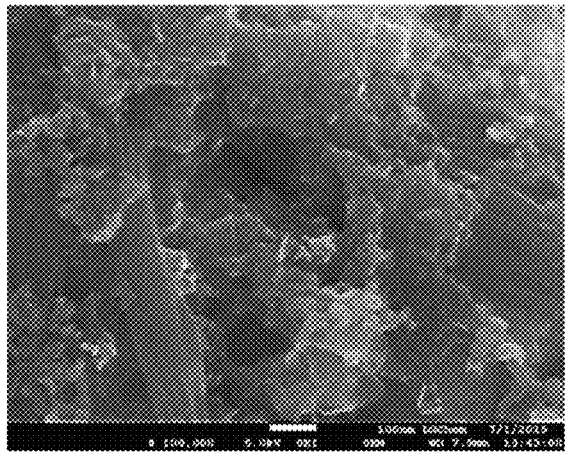

Referring to FIGS. 6, 7, and 8, in the positive electrode of Example 1, it may be confirmed that carbon nanotube structures in the form of a rope formed a network structure to connect NCM622 particles to each other. Also, it may be confirmed that the secondary particles formed a conductive network closely while covering the carbon nanotube structure.

Example 2: Preparation of Positive Electrode

A positive electrode was prepared in the same manner as in Example 1 except that the secondary particle dispersion of Preparation Example 2 was used instead of the secondary particle dispersion of Preparation Example 1.

Example 3: Preparation of Positive Electrode

A positive electrode was prepared in the same manner as in Example 1 except that the carbon nanotube structure dispersion of Preparation Example 4 was used instead of the carbon nanotube structure dispersion of Preparation Example 3 in Example 1.

Example 4: Preparation of Positive Electrode

A positive electrode was prepared in the same manner as in Example 1 except that 0.2 wt % of the secondary particles and 0.1 wt % of the carbon nanotube structure were included in the final positive electrode by varying amounts of the secondary particle dispersion of Preparation Example 1 and carbon nanotube structure dispersion of Preparation Example 3 used.

Comparative Example 1: Preparation of Positive Electrode

A positive electrode was prepared in the same manner as in Example 1 except that the carbon black dispersion of Preparation Example 5 was used instead of using the secondary particle dispersion of Preparation Example 1 and the carbon nanotube structure dispersion of Preparation Example 3.

Comparative Example 2: Preparation of Positive Electrode

A positive electrode was prepared in the same manner as in Example 1 except that 0.7 wt % of the secondary particle dispersion of Preparation Example 1 was only used without using the carbon nanotube structure dispersion of Preparation Example 3.

Comparative Example 3: Preparation of Positive Electrode

A positive electrode was prepared in the same manner as in Example 1 except that 0.7 wt % of the carbon nanotube structure dispersion of Preparation Example 3 was only used without using the secondary particle dispersion of Preparation Example 1.

Comparative Example 4: Preparation of Positive Electrode

Figure 9:
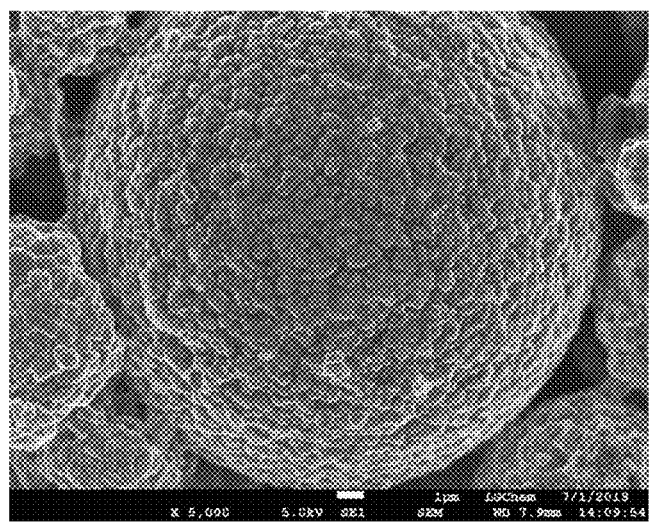
FIG. 9 is an SEM image of an electrode of Comparative Example 4.

A positive electrode was prepared in the same manner as in Example 1 except that the single-walled carbon nanotube unit dispersion of Preparation Example 6 was used instead of the carbon nanotube structure dispersion of Preparation Example 3. Referring to FIG. 9, short single-walled carbon nanotube units were only observed in the positive electrode of Comparative Example 4, but no carbon nanotube structure was observed.

Comparative Example 5: Preparation of Positive Electrode

A positive electrode was prepared in the same manner as in Example 1 except that the multi-walled carbon nanotube unit dispersion of Preparation Example 7 was used instead of the carbon nanotube structure dispersion of Preparation Example 3.

Comparative Example 6: Preparation of Positive Electrode

A positive electrode was prepared in the same manner as in Example 1 except that the graphene dispersion of Preparation Example 8 was used instead of the secondary particle dispersion of Preparation Example 1.

TABLE 1

| | Secondary particle content (wt %) | Carbon nanotube structure content (wt %) | Single-walled carbon nanotube unit (completely dispersed form) content (wt %) | Carbon black content (wt %) | Multi-walled carbon nanotube unit content (wt %) | Graphene content (wt %) |
|---|---|---|---|---|---|---|
| Example 1 | 0.3 | 0.1 | — | — | — | — |
| Example 2 | 0.3 | 0.1 | — | — | — | — |
| Example 3 | 0.3 | 0.1 | — | — | — | — |
| Example 4 | 0.2 | 0.1 | — | — | — | — |
| Comparative Example 1 | — | — | — | 0.7 | — | — |
| Comparative Example 2 | 0.7 | — | — | — | — | — |
| Comparative Example 3 | — | 0.7 | — | — | — | — |
| Comparative Example 4 | 0.3 | — | 0.1 | — | — | — |
| Comparative Example 5 | 0.3 | — | — | — | 0.1 | — |
| Comparative Example 6 | — | 0.1 | — | — | — | 0.3 |

In Examples 1, 2, and 4, and Comparative Examples 3 and 6, an average diameter of the carbon nanotube structure was 100 nm, and an average length thereof was 15.6 µm. In Example 3, an average diameter of the carbon nanotube structure was 10 nm, and an average length thereof was 8.2 µm. In Comparative Example 4, an average diameter of the single-walled carbon nanotube unit was 1.6 nm, and an average length thereof was 1.8 µm.

In Comparative Example 5, an average diameter of the multi-walled carbon nanotube unit was 10.8 nm, and an average length thereof was 1.3 µm.

The average diameter and average length correspond to an average value of diameters (or lengths) of top 100 carbon nanotube structures (or multi-walled carbon nanotube units, or single-walled carbon nanotube units) with a larger diameter (or length) and bottom 100 single-walled carbon nanotube structures (or multi-walled carbon nanotube units, or single-walled carbon nanotube units) with a smaller diameter (or length) when the prepared positive electrode is observed by a TEM.

In Comparative Example 6, an average length of the graphene was 4.6 µm, and an average thickness thereof was 5.3 nm, and the average length and average thickness correspond to an average value of lengths (or thicknesses) of top 100 graphenes with a larger length (or thickness) and bottom 100 graphenes with a smaller length (or thickness) when the prepared positive electrode is observed by a TEM.

Physical properties of the secondary particles (the secondary particles of Preparation Example 1) included in the positive electrodes of Examples 1, 3, and 4 and Comparative Examples 2, 4, and 5, and the secondary particles (the secondary particles of Preparation Example 2) included in the positive electrode of Example 2 are as follows.

TABLE 2

| | Lateral size of graphene sheet (nm) | Nitrogen adsorption specific surface area (m²/g) | Iodine adsorption value (mg/g) | Oxygen content (wt %) | Raman spectrum D/G ratio |
|---|---|---|---|---|---|
| Secondary particles of Preparation Example 1 | 41 | 825 | 849 | 8.9 | 1.42 |
| Secondary particles of Preparation Example 2 | 65 | 712 | 736 | 3.2 | 1.27 |

1) Lateral size (nm) of the graphene sheet included in the secondary particle: after sizes of 100 graphene sheets included in the secondary particle in the positive electrode were measured with a TEM (JEOL, JEM-2010F), it was evaluated as an average of the sizes. 2) Nitrogen adsorption specific surface area (m²/g): it was measured by degassing at 200° C. for 8 hours and performing $N_2$ adsorption/desorption at 77K using a BET measurement instrument (BEL-SORP-MAX, Nippon Bell). 3) Iodine adsorption value (mg/g): it was measured according to ASTM D1510.

4) Oxygen content (wt %): amounts of C, H, and N elements were measured by an elemental analyzer (CHN-coder MT-5, Yanako), and the oxygen content (differential) was calculated to reflect an amount of residual ash.

5) Raman spectrum D/G ratio: it was measured by analyzing a Raman spectrum obtained using an Ar-ion laser with a wavelength of 514.5 nm by a Raman spectrometer (NRS-2000B, Jasco).

Referring to FIGS. 6, 7, and 8, with respect to all of the positive electrodes of the examples, it may be understood that the carbon nanotube structure in the form of a flexible long rope (form in which 2 to 5,000 single-walled carbon nanotube units are arranged side by side and bonded to each other) and the secondary particles formed a conductive network structure well in the positive electrode active material layer.

Experimental Example 1: Evaluation of Powder Resistance of Electrode Slurry

Powder resistance was evaluated for the electrode slurries formed in the preparation of the positive electrodes of Examples 1 to 4 and Comparative Examples 1 to 6 by the following method.

The positive electrode slurries were vacuum-dried at a temperature of 130° C. for 3 hours and then ground to prepare powders. Thereafter, the powders were prepared as pellets under a load of 9.8 MPa at 25° C. and a relative humidity of 50% using a Loresta GP instrument from Mitsubishi Chem. Analytec. Co., Ltd. Thereafter, powder resistance was measured by a 4-probe method, and the results thereof are presented in Table 3.

Experimental Example 2: Battery Life Characteristics Evaluation

Batteries were respectively prepared as follows by using the positive electrodes of Examples 1 to 4 and Comparative Examples 1 to 6.

Artificial graphite as a negative electrode active material, carbon black as a negative electrode conductive agent, a styrene-butadiene rubber (SBR) as a negative electrode binder, and carboxymethyl cellulose (CMC) were mixed in distilled water at a weight ratio of 96.1:0.5:2.3:1.1 to prepare a negative electrode slurry. A 20 µm thick negative electrode collector (Cu) was coated with the prepared slurry so that a loading amount was 10 mg/cm² and dried. Thereafter, the negative electrode collector on which the negative electrode slurry was disposed was rolled by a roll rolling method such that a total thickness of the negative electrode slurry and the negative electrode collector was 80 µm. Thereafter, the negative electrode slurry and the negative electrode collector were dried at 110° C. for 6 hours to prepare a negative electrode.

Thereafter, after a mono-cell was prepared by combining the above-prepared negative electrode and the above-described positive electrode with a 15 µm thick polyethylene-based separator disposed therebetween, an electrolyte solution (ethylene carbonate (EC)/ethylmethyl carbonate (EMC)= 1/2 (volume ratio)), lithium hexafluorophosphate (1 M $LiPF_6$)) was injected into the mono-cell to prepare a lithium secondary battery.

Charge and discharge of each of the lithium secondary batteries were performed under the following conditions.

Charge/discharge of each lithium secondary battery at 0.33 C/0.33 C in a voltage range of 4.25 V to 2.8 V at 45° C. were set as one cycle, and total 100 cycles were performed. Thereafter, discharge capacity (capacity retention) after 100 cycles was evaluated based on discharge capacity after one cycle at 100% and presented in Table 3.

TABLE 3

| | Powder resistance of positive electrode slurry (Ω) | Capacity retention (%) |
|---|---|---|
| Example 1 | 15.7 | 96.1 |
| Example 2 | 14.9 | 96.8 |
| Example 3 | 18.1 | 95.3 |
| Example 4 | 17.6 | 95.1 |
| Comparative Example 1 | 253.3 | 79.4 |
| Comparative Example 2 | 53.7 | 90.8 |
| Comparative Example 3 | 15.1 | 93.6 |
| Comparative Example 4 | 98.9 | 85.3 |
| Comparative Example 5 | 75.6 | 88.2 |
| Comparative Example 6 | 218.7 | 80.3 |

The invention claimed is:

1. An electrode comprising an electrode active material layer,
wherein the electrode active material layer comprises an electrode active material and a conductive agent,
wherein the conductive agent comprises a first conductive agent and a second conductive agent,
wherein the first conductive agent comprises a secondary particle in which a plurality of graphene sheets are arranged in different directions and a portion of one graphene sheet is connected to a portion of adjacent another graphene sheet,
the second conductive agent comprises a carbon nanotube structure in which 2 to 5,000 single-walled carbon nanotube units are bonded side by side in a single plane,
wherein the carbon nanotube structures are interconnected in the electrode to form a network structure, and
wherein the carbon nanotube structure has an average diameter of 2 nm to 200 nm.

2. The electrode of claim 1, wherein a weight ratio of the secondary particle to the carbon nanotube structure is in a range of 100:1 to 100:200.

3. The electrode of claim 1, wherein the secondary particle is included in an amount of 0.01 wt % to 1.0 wt % in the electrode active material layer.

4. The electrode of claim 1, wherein the carbon nanotube structure has an average length of 1 μm to 500 μm.

5. The electrode of claim 1, wherein the carbon nanotube structure has an average diameter of 50 nm to 120 nm.

6. The electrode of claim 1, wherein the single-walled carbon nanotube unit has an average diameter of 0.5 nm to 5 nm.

7. The electrode of claim 1, wherein an oxygen content of the secondary particle is in a range of 1 wt % to 10 wt % based on a total weight of the secondary particle.

8. The electrode of claim 1, wherein the carbon nanotube structure is a carbon nanotube structure in which 50 to 4,000 single-walled carbon nanotube units are bonded to each other.

9. The electrode of claim 1, wherein the graphene sheet has a lateral size of 10 nm to 500 nm.

10. The electrode of claim 1, wherein the secondary particle has a D/G peak ratio of 0.9 to 2.0 during Raman spectrum measurement.

11. The electrode of claim 1, wherein the secondary particle has a value calculated by Equation 1 of 0 to 0.2:

$$\frac{|b-a|}{a} \qquad \text{[Equation 1]}$$

wherein, in Equation 1, a is a specific surface area (m$^2$/g) of the secondary particle which is measured by a nitrogen adsorption Brunauer-Emmett-Teller (BET) method, and b is an iodine adsorption value (mg/g) of the secondary particle.

12. The electrode of claim 1, wherein the secondary particle further comprises a connection portion connected to at least a part of the graphene sheets of the plurality of graphene sheets,
wherein the connection portion has a non-graphene shape.

13. The electrode of claim 12, wherein at least a portion of each of the plurality of graphene sheets is connected to the connection portion.

14. The electrode of claim 1, wherein the graphene sheet has an average thickness of 0.34 nm to 10 nm.

15. The electrode of claim 1, wherein the secondary particle has a specific surface area (m$^2$/g) measured by a nitrogen adsorption BET method of 200 m$^2$/g to 1,100 m$^2$/g.

16. The electrode of claim 1, wherein the electrode is a positive electrode.

17. The electrode of claim 1, wherein the carbon nanotube structure is included in an amount of 0.01 wt % to 0.5 wt % in the electrode active material layer.

18. A secondary battery comprising the electrode of claim 1.

* * * * *